July 15, 1930.  D. A. BAKER  1,770,451
TELESCOPE SIGHT MOUNTING
Filed April 27, 1925   2 Sheets-Sheet 1
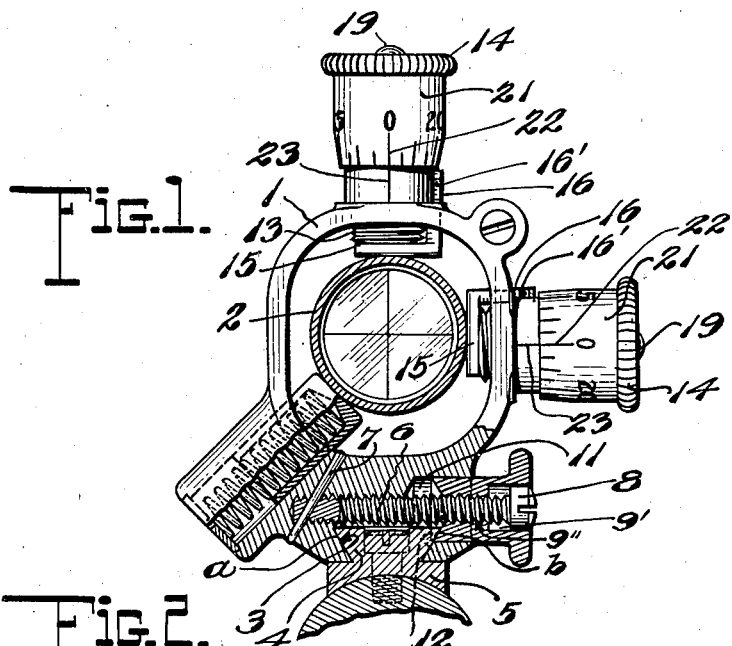
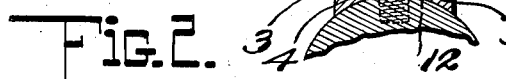
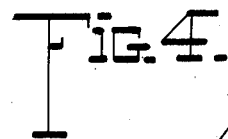
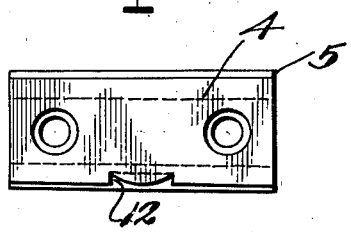
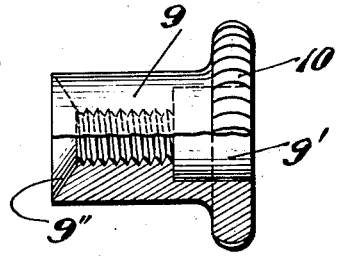
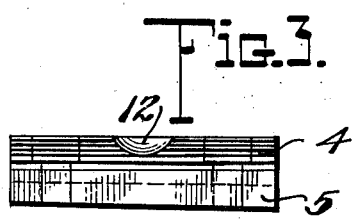
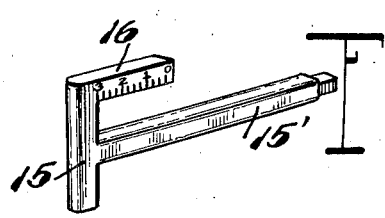
Inventor
D. A. Baker
Witness:

July 15, 1930.  D. A. BAKER  1,770,451
TELESCOPE SIGHT MOUNTING
Filed April 27, 1925   2 Sheets-Sheet 2
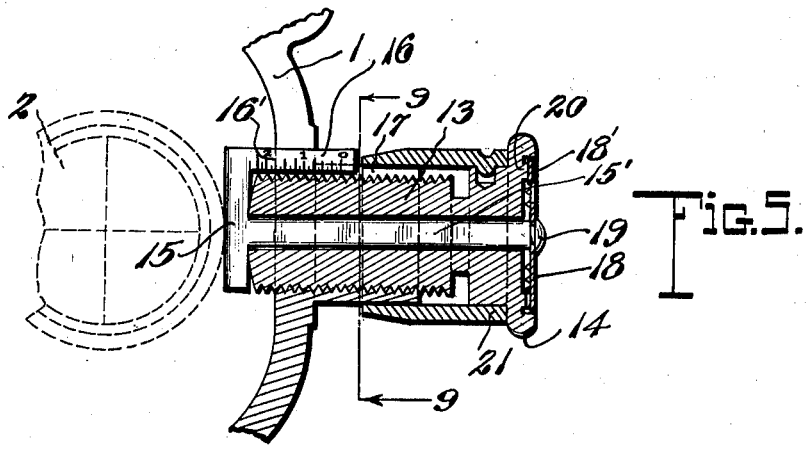
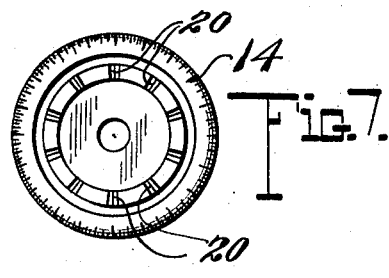
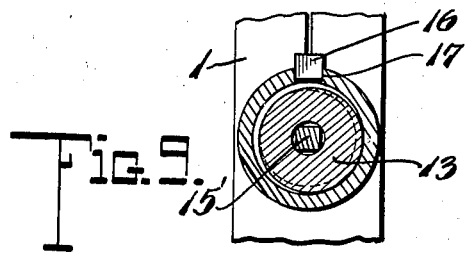
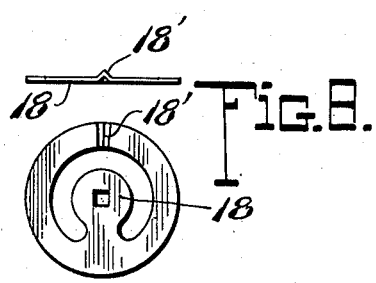
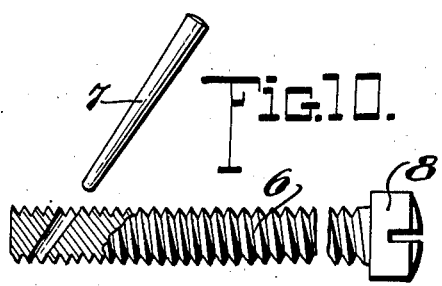
Inventor
D. A. Baker Patented July 15, 1930

1,770,451

UNITED STATES PATENT OFFICE

DONALD A. BAKER, OF CLEVELAND, OHIO, ASSIGNOR TO J. WALTER FECKER, OF CLEVELAND, OHIO

TELESCOPE-SIGHT MOUNTING

Application filed April 27, 1925. Serial No. 26,123.

I have designed a means for attaching the telescope mount to the base block which obviates the defective features of the present known construction by utilizing a setting or binding screw permanently fastened to the mount, and screw actuated means which operates to clamp the mount on the base block by binding or impinging the same with equal impinging effects at opposite sides of the block, and by which the liability of throwing the mount out of alignment through distortion of any portion thereof is eliminated.

In respect to the customarily used screw means now depended upon for adjusting the telescope in the mount for elevation and windage purposes I have designed special improvements. The screws of the present means have their ends in direct contact with the telescope. But it is known that at only one point of windage or elevation adjustment is the telescope tube in contact with the screw throughout the full width of the bearing end of the latter. Obviously, therefore, the slightest adjustment from this point, on turning the screw, will throw the bearing contact portion toward the edge of the screw end, and the bearing then becomes a spherical one instead of a flat one so that each adjustment will correspond to the radius developed by the curved surface. Moreover, in addition to the foregoing inaccuracy, should the ends of the screws not be at right angles to the body portions, or the edges of the screw ends damaged or eccentric on account of inaccuracy of making, other and serious errors of adjustment through the cooperation of the screws and telescope must result.

In the carrying out of my invention hereto, the defects just described are likewise obviated because I provide a special bearing head engaging the telescope, susceptible of desired adjustment in each instance where it is used for controlling windage or elevation, and which head does not rotate but maintains a permanent predetermined contacting relation with the telescope obviating possibilities of inaccurate adjustments of the latter such as above pointed out. Additionally I make provision in regard to the adjusting means for the telescope sight, by which windage and elevation adjustments are made, for visually determining the adjustment, and determining it audibly and by feeling, a click device being used for the latter purpose enabling adjustments to be made in the dark when the operator can not see the graduations employed for the visual adjustment purposes.

A full understanding of my invention will be had on reference to the accompanying drawings, in which

Figure 1 is an elevational view of a telescope gun sight mount embodying the invention, the base portion broken away and shown in section.

Figure 2 is a top plan view of the base block supporting the mount.

Figure 3 is a side view of said base block.

Figure 4 is a detail sectional view of the clamp nut for securing the mount on the base block.

Figure 5 is a longitudinal sectional view of the adjusting means used for moving the sight for elevation and windage adjustments.

Figure 6 is a detail perspective view of the telescope sight engaging head.

Figure 7 is a front elevation of the finger or turning knob of the adjusting screw.

Figure 8 is a front view of the click plate, combined with an edge view.

Figure 9 is a section on line 9—9 of Figure 5.

Figure 10 is a detail view of the clamping screw and its retaining pin.

Referring to the drawings it will be noted that I use the customary construction of mount 1 for the supporting of the telescopic sight 2, so far as the general formation of the mount independently of the adjusting and attaching features is concerned. In other words the mount 1 is of loop-form and its base is provided with a dovetail groove 3 therein, receiving the head 4, of corresponding shape, of the base block 5. The block 5 is permanently attached to the barrel of the gun in the usual way by suitable screws or otherwise. The base of the mount 1 above the groove 3 is provided with a transverse threaded opening therethrough, in which opening a screw 6 is received and locked against rotation by a locking pin 7.

The screw 6 is provided with a screw head 8 for screwing it into place and removing it, said head engaging and holding in place on the base of the mount, an adjusting member 9 having a turning piece or knob 10 at its outer end. The base of the mount 1 is furthermore provided with a recess of round form designated 11, in which the adjusting member 9 is received. The side of the dovetail head 4 adjacent to the adjusting member 9 is formed with a notch or recess 12 for engagement by the inner end of the adjusting member 9, the latter being formed on its inner end face with a countersink or concave portion corresponding somewhat with the curvature or formation of the countersink or notches 12 of the head 4.

The screw 6 passes through an opening lengthwise of the adjusting member 9, the head of the screw entering a recess 9' concentrically formed in the member 9 and extending inwardly from the outer extremity of the latter in this way. The adjusting member 9 is threaded to receive the screw 6 and the connection between the mount 1 and the base block 5 is established by screwing of the member 9 while turning in the opening 11, said member 9 having a threaded opening 9" to fit the screw threaded shank of the screw 6.

It will be evident from the foregoing that by simply turning the adjusting member 9 while the screw 6 remains stationary, said member 9 will bear against the head 4 at the notched surface, and the surface of the mount 1 at *a* together with the surface of the adjusting member 9 at *b* will engage opposite sides of the head 4 with equal impinging effects, and without straining or distorting the lower portion of the mount in any way. Furthermore the adjusting means for securing the mount to the base block 5 is a permanent part of the mount when once applied thereto, and is not removable in the ordinary use of the device because the pin 7 has to be taken out before the structure can be disassembled.

Referring now to Figures 5 to 8 inclusive particularly, the adjusting means for windage and elevational adjustment of the telescope sight will be described. Said means comprises an adjusting member in the form of a screw 13 having at its outer end a finger piece or knurled knob 14 for turning purposes. At the inner end thereof, said member or screw 13 has a cross-head 15 for contact or engagement with the telescope sight, said head having a flat contacting surface at its outer side. To prevent turning of the head which might result in a variation of its contacting action on the outer surface of the sight, said head is equipped with a projection or lug 16 entering a groove or recess 17 at one side of the threaded opening in the mount in which the screw 13 is screwed.

The head 15 is provided with a shank or stem 15' which passes through the screw 13 and projects beyond the outer end of the latter to enable the attachment thereto of the click plate 18 which is preferably made of tempered spring steel and formed with the click 18' seen in Figure 8. The click plate 18 is permanently attached to the outer end of the shank 15', preferably by upsetting or riveting the same to the latter as shown at 19. On the outer surface of the handle or finger piece 14 for the member 13 is formed a circular row of indentations 20, the same being concentric with the click plate 18 and operating in a path enabling the click element 18' to enter the indentations 20 as the member 13 is rotated. Surrounding the member 13 is a sleeve 21 permanently attached thereto in any suitable way and having graduations 22 adapted to cooperate with the zero line graduation 23 on the mount, 1, whereby the adjusted position of the screw 13 may be predetermined to obtain the desired adjustments of the head 15 in cooperation with the telescope sight. Obviously if the user of the gun is located in a dark firing point destroying visibility, he may turn the member 13 by the finger piece or handle 14 and then adjustment of the member 13 may be readily accomplished through the cooperation of the click plate 18 and indentations 20, because the user can feel the click action of the latter in an obvious manner. As a further means for noting the adjustment of the sight either for windage or elevation, the lug or projection 16 may be provided with graduations 16' whereby the user of the gun may readily see at what adjustment the head 15 is located. The inner end of the screw 13 may be rounded as desired in order to operate freely in relation to the head 15.

It is to be understood that two of the adjusting devices described on reference to Figures 5 to 8 inclusive, are used on the sight mount, one for elevation adjustments of the telescope sight and the other for its windage adjustments.

Having thus described my invention, what I claim as new and desire to secure by Letters Patent, is:

1. In combination, a sight mount, a telescope sight mounted therein, means for adjusting the sight relatively to the mount including a head contacting with the sight, means for moving the head relatively to the mount while in contact with the sight for adjusting the latter, and a click device cooperating with said moving means to determine the extent of movement of the head, said head being slidable on the mount and having means slidably engaging the mount to prevent the head from turning.

2. In combination, a sight mount, a telescope sight mounted therein, means for adjusting the sight relatively to the mount including a head contacting with the sight, means for moving the head relatively to the mount while in contact with the sight for adjusting the latter, and a click device cooperating with said moving means to determine the extent of movement of the head, said head being slidable on the mount, and having means slidably engaging the mount to prevent the head from turning, there being graduations on the head to determine the adjusted position of the head.

3. In combination, a sight mount, a telescope sight mounted thereon, a screw carried by the mount, a head cooperating with said screw and slidable on the mount and operable by the screw and contacting at one end with the sight, means on the head and slidable in said mount for preventing turning of said head relatively to the mount, and turning means for the screw to actuate the same and thereby move the head to move the sight.

4. In combination, a sight mount, a telescope sight mounted thereon, a screw carried by the mount, turning means for the screw having indentations, a head cooperating with said screw and having slidable connection with the mount and operable by the screw and contacting with the sight, means for preventing turning of said head relatively to the mount, the turning means for the screw adapted to actuate the same and thereby move the head to move the sight, a shank extending from the head through the screw, and a click device carried by said shank at its free end and cooperating with the indentations on the screw turning means to audibly determine the turning action of the latter and extent of actuation of the head by the screw.

5. In combination an apertured sight mount, a telescope sight mounted therein, means for adjusting the sight in said aperture comprising a head movable in said aperture and having a shank slidably connected with the sight mount, and a member threadedly connected with the sight mount and rotatably connected with the head for moving the head and sight transversely in said mount.

6. In combination, a sight mount, a telescope sight mounted therein, means for adjusting the sight relatively to the mount, said means including a head contacting with the sight, means for moving the head relatively to the mount while in contact with the sight for adjusting the latter, said head being slidable on the mount, and having means slidably engaging the mount to prevent the head from turning, there being graduations on the head to determine the adjusted position of the head.

In testimony whereof I affix my signature.

DONALD A. BAKER.